United States Patent [19]

Claxton

[11] 3,909,022

[45] Sept. 30, 1975

[54] CABLE SUSPENSION FOR HARVESTING MACHINE

[75] Inventor: Gerald L. Claxton, Lafayette, Calif.

[73] Assignee: Upright, Inc., Berkeley, Calif.

[22] Filed: Aug. 3, 1973

[21] Appl. No.: 385,456

[52] U.S. Cl................ 280/6 H; 280/112 R; 56/212
[51] Int. Cl.². .......................................... B60S 9/12
[58] Field of Search... 280/64, 104, 106.5 R, 112 R, 280/112 A, 124 R; 267/11 R, 11 A; 56/209, 212, 213

[56] References Cited
UNITED STATES PATENTS

| | | | |
|---|---|---|---|
| 1,313,167 | 8/1919 | Cosgrove | 280/104 |
| 2,506,395 | 5/1950 | Straub | 280/104 |
| 2,887,322 | 5/1929 | De Monge | 280/112 A |
| 3,216,736 | 11/1965 | Thomas | 280/112 R |
| 3,459,436 | 8/1969 | Rusconi | 280/104 |
| 3,490,786 | 1/1970 | Ravenel | 267/11 R |
| 3,709,517 | 1/1973 | Wossner | 280/104 |

Primary Examiner—Philip Goodman
Assistant Examiner—John A. Carroll
Attorney, Agent, or Firm—Phillips, Moore, Weissenberger Lempio & Strabala

[57] ABSTRACT

A generally rectangular frame having a vertical support column at each corner thereof each mounted for vertical movement relative to the frame. Hydraulic cylinders adjust the height of the frame relative to the columns at one end of the frame, the cylinders being operable to maintain the frame level from side to side in spite of variations in slope of the ground on which the frame is supported. A cable suspension system slaving the two columns at the other end of the frame supports the frame from the two columns at the other end together and suspends the frame therefrom in such manner that the supports may move vertically relative to the frame to maintain ground engagement of the supports in spite of variations in ground slope while supporting the frame level from side to side. The hydraulic system and cable suspension system cooperate to enable the frame to be raised or lowered on all columns simultaneously.

21 Claims, 18 Drawing Figures

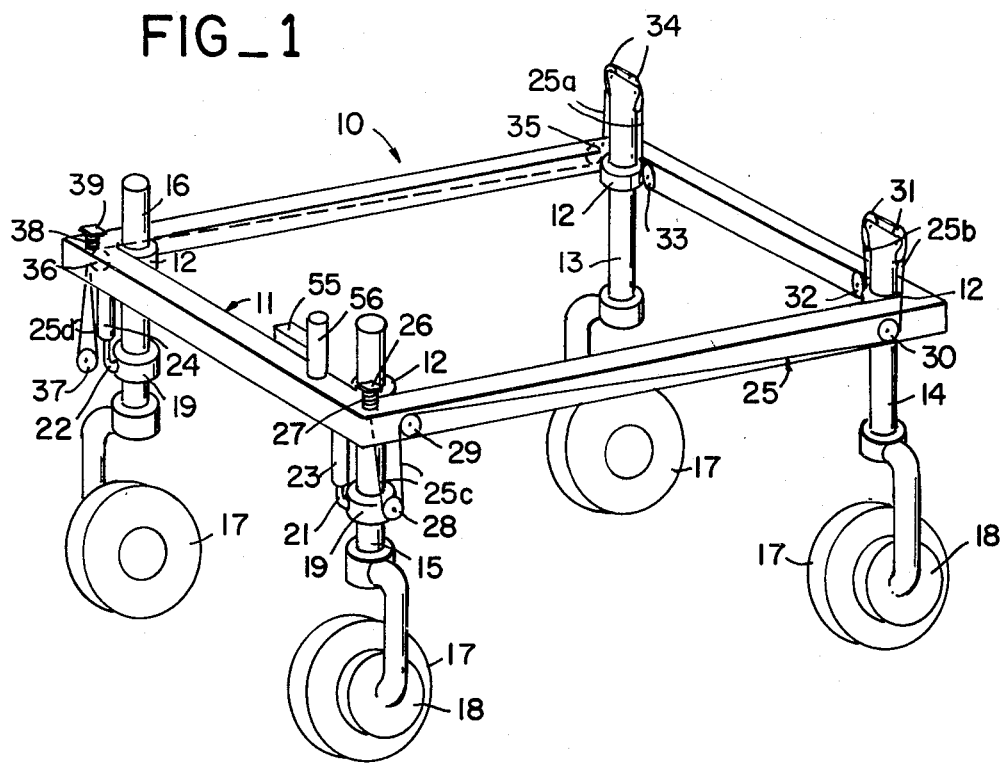
FIG_1
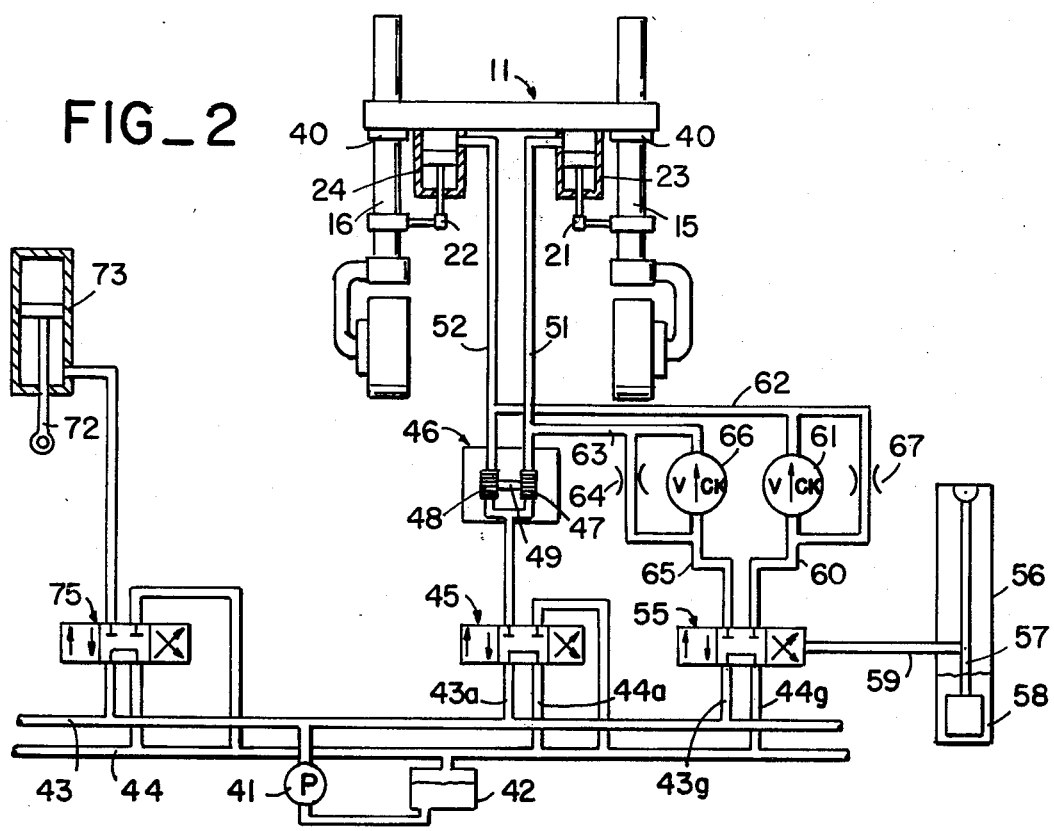
FIG_2

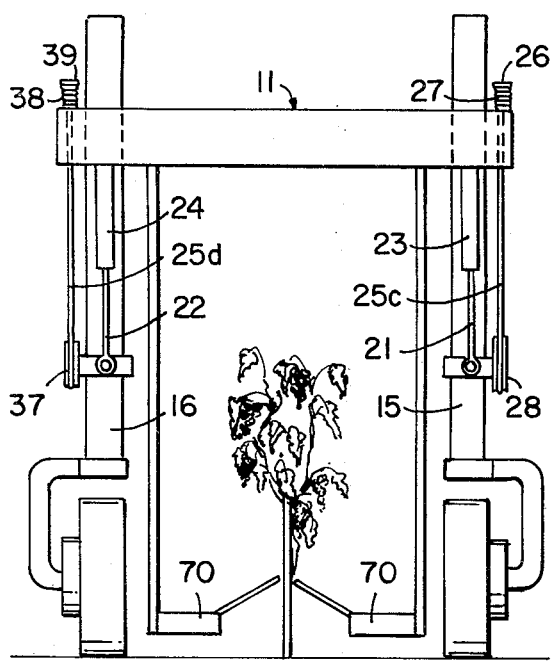
FIG_3
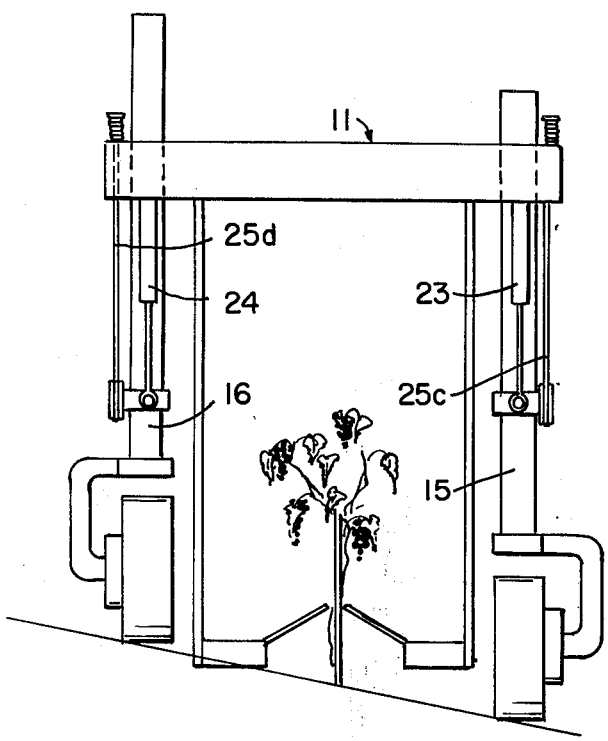
FIG_4
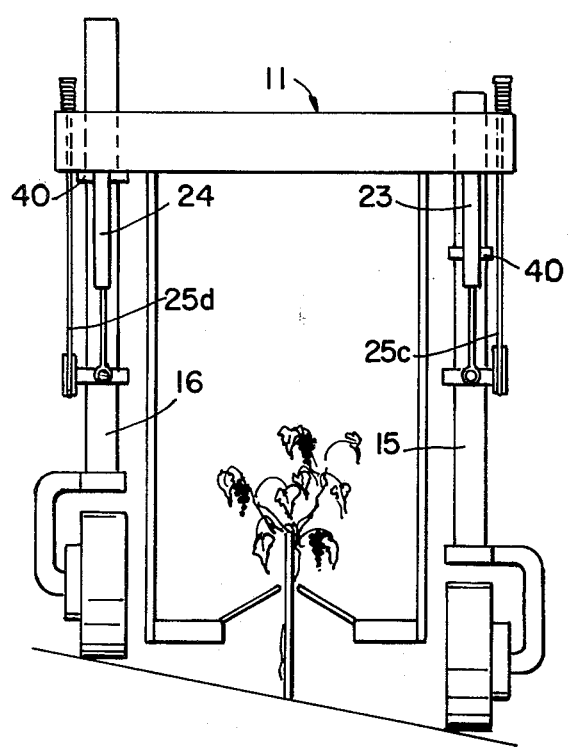
FIG_5
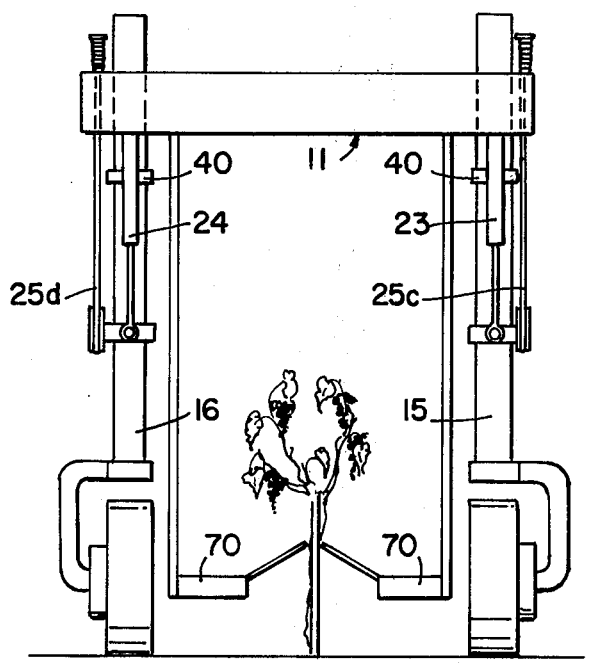
FIG_6

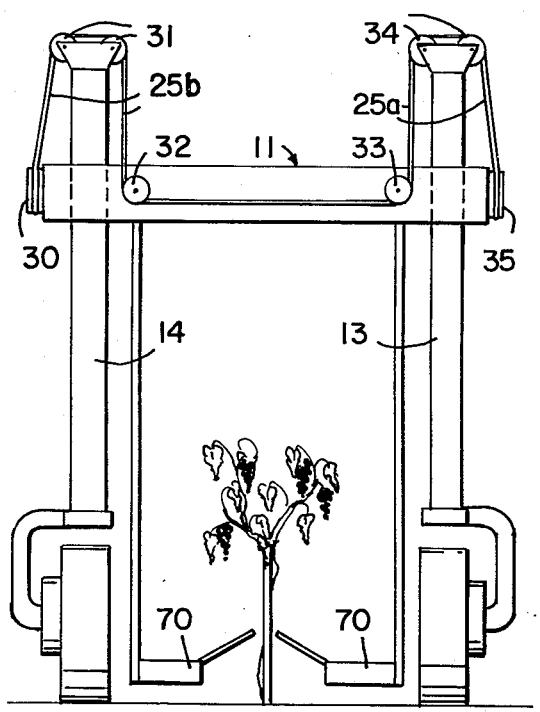
FIG_7
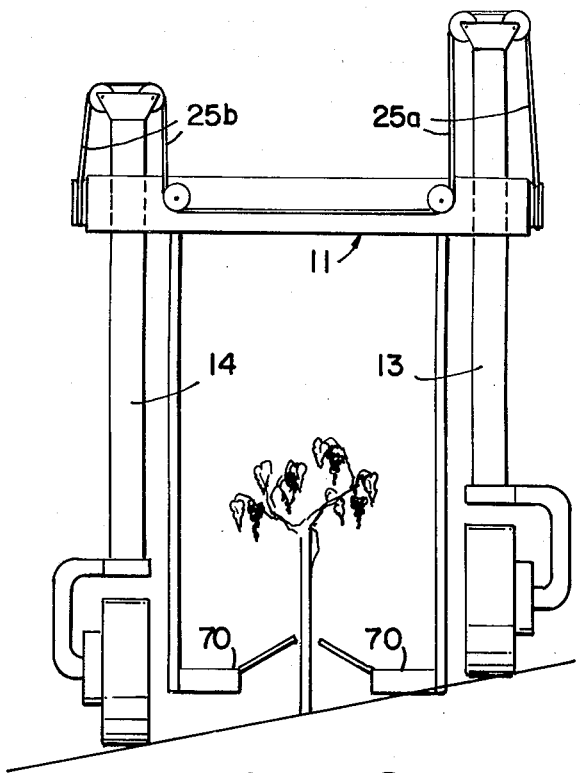
FIG_8
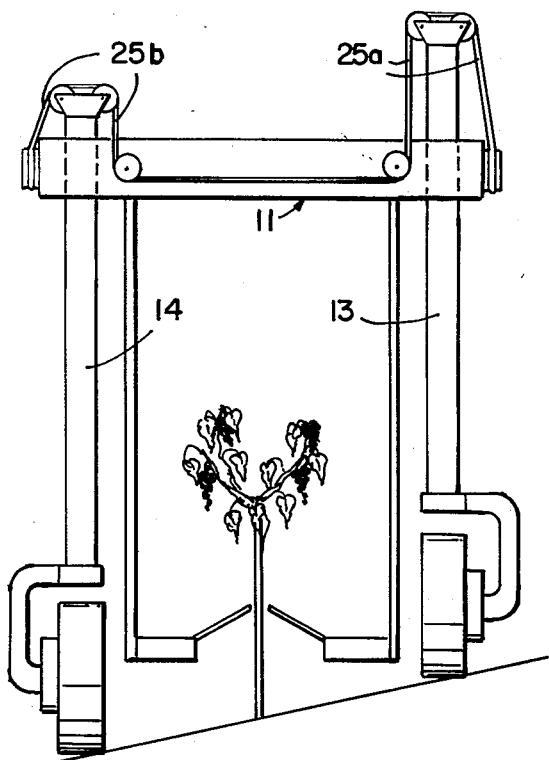
FIG_9
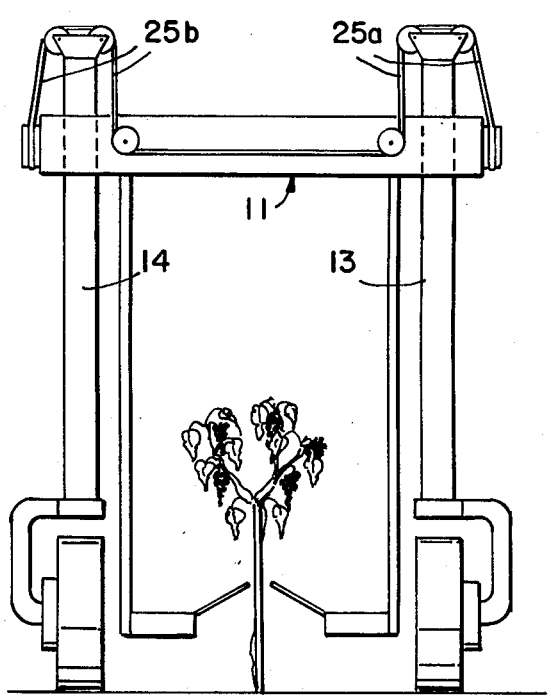
FIG_10

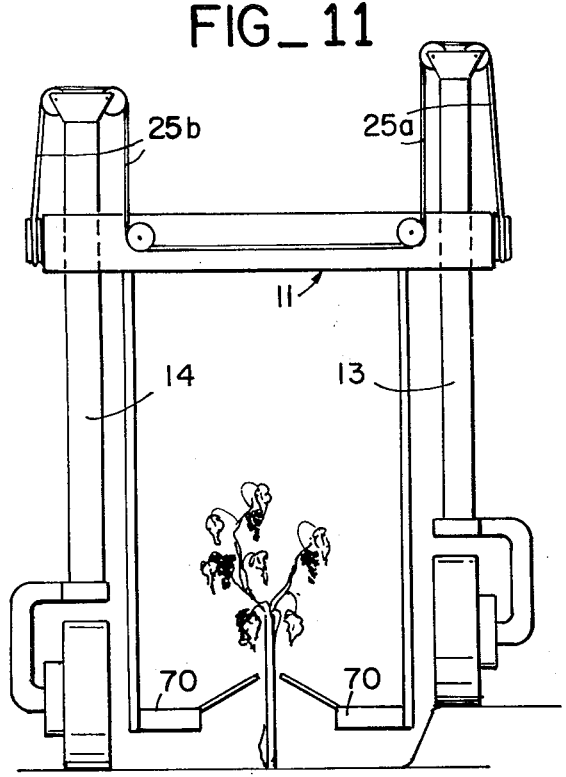
FIG_11
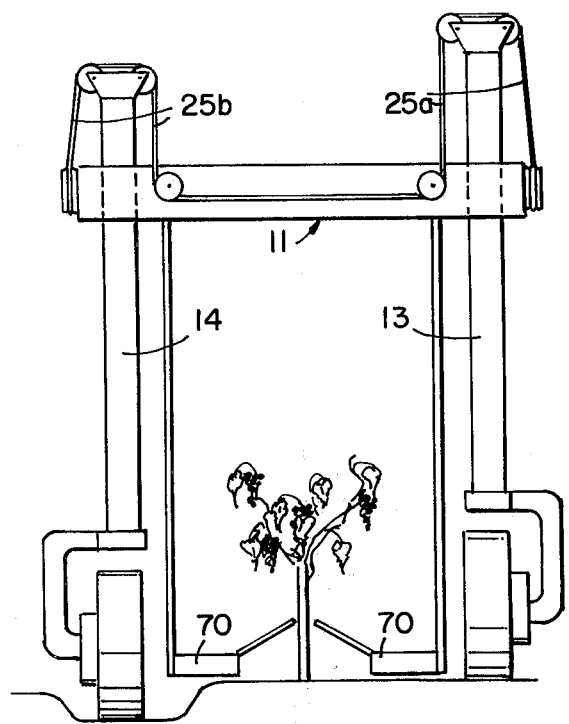
FIG_12
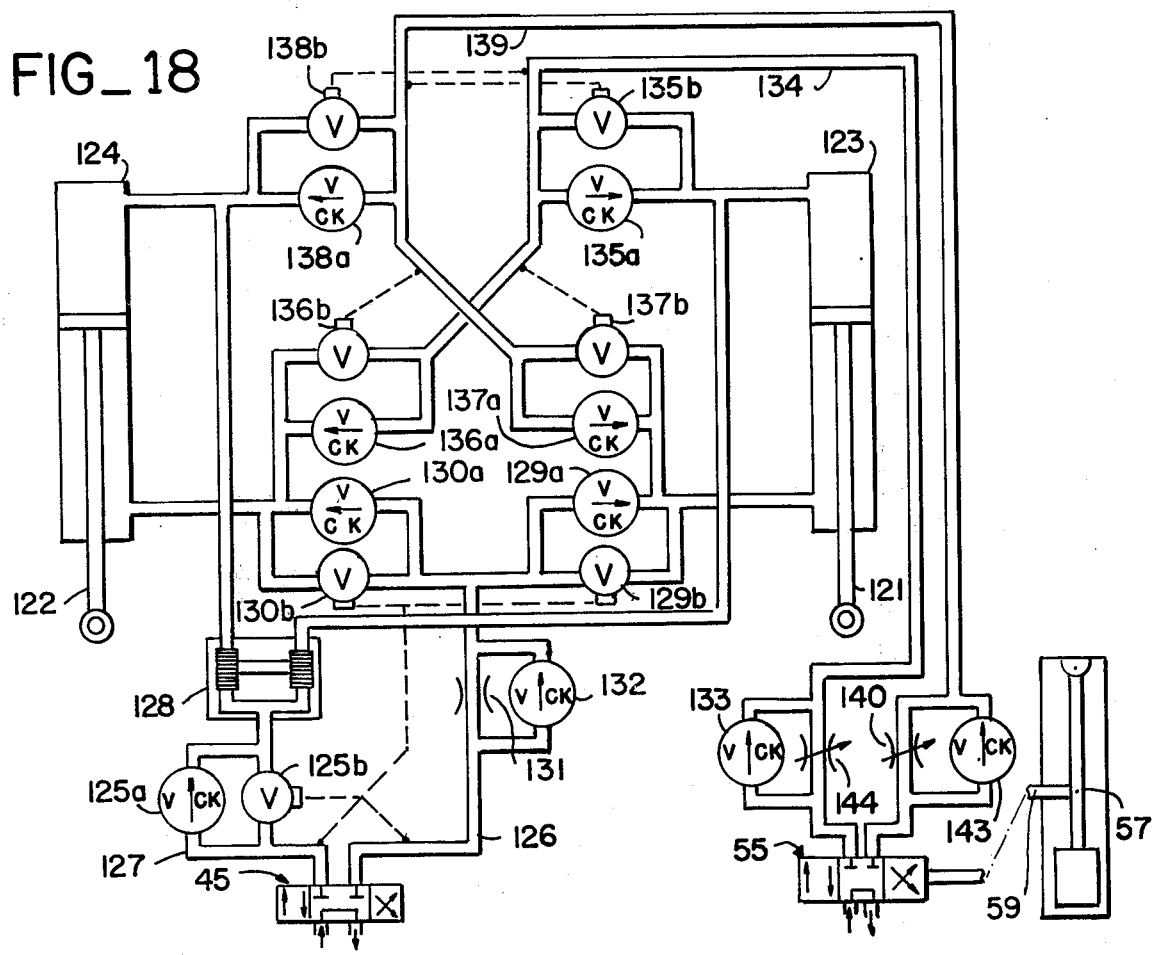
FIG_18

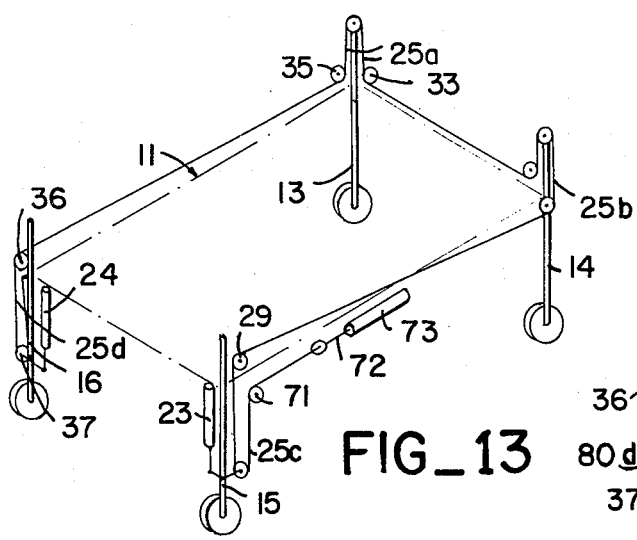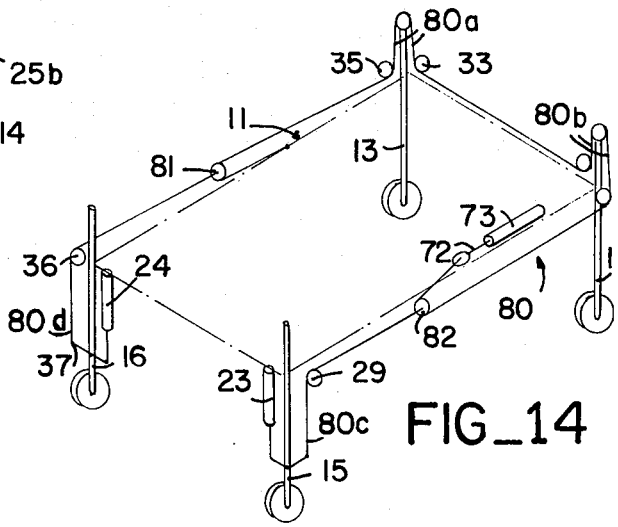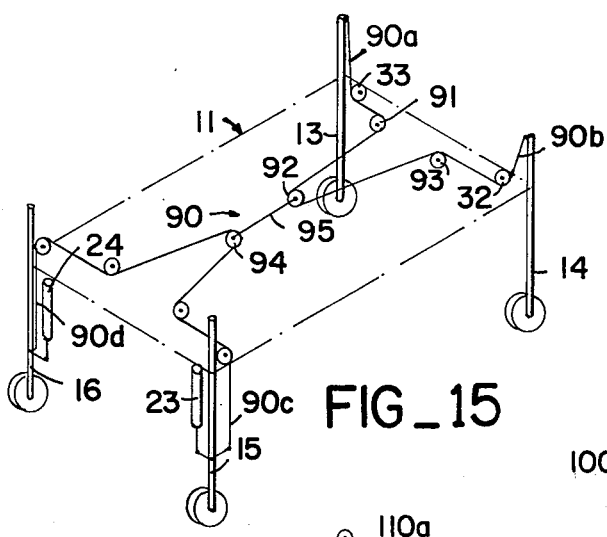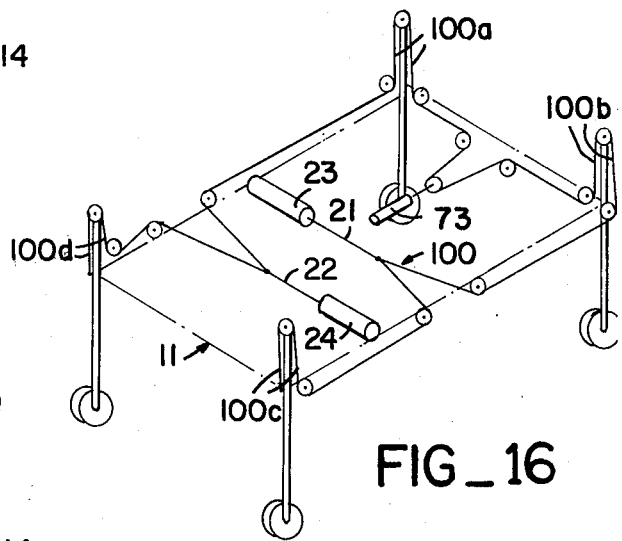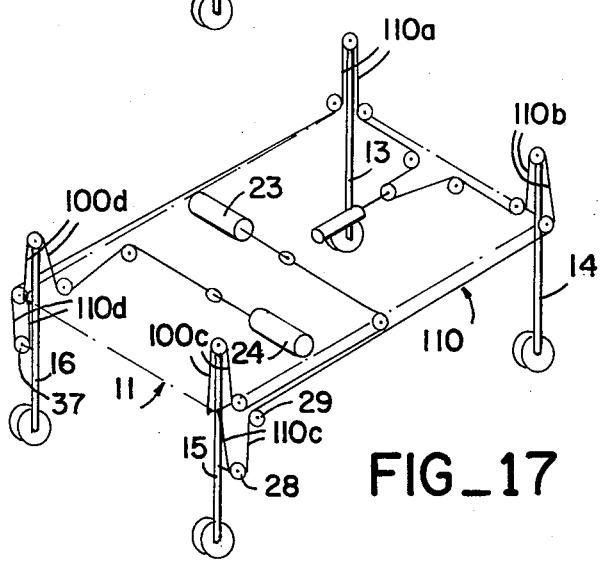

CABLE SUSPENSION FOR HARVESTING MACHINE

BACKGROUND OF THE INVENTION

Although its use is not limited thereto, the present invention has particular application to mechanical harvesting machines of the type such as shown in my copending application Ser. No. 292,083, filed Sept. 25, 1972 and entitled "Fruit Harvesting Machine and Conveyor Therefor," wherein a main frame is supported above a row of fruited plants by corner columns which have wheels at the lower ends thereof, the machine being operated to straddle and move along the row while frame-supported picking apparatus agitates the plants, causing the fruit to be dislodged to fall into catchers and conveyors carried by the frame and disposed beneath and below the plants.

In many instances the rows of plants are planted on the side of a hill so that the harvester must traverse across sloping ground, so that the wheels on the uphill side of the machine are at a level above the wheels on the other side of the machine. Since such machines have a high center of gravity, it is very desirable that the machine be maintained in level condition from side to side, by adjusting the height of the frame relative to the wheel columns. This is particularly important with narrow machines designed to harvest closely spaced rows.

Yoke systems have been devised to mount the frame, or the picking apparatus carried thereby, relative to the wheeled supports in such manner that the frame or picking apparatus can swing from side to side if the wheeled columns are higher on one side than the other. This will maintain levelness, but the longitudinal centerline of the picking apparatus will be moved away from the centerline of the row, making it difficult to harvest and gather the fruit properly.

Hydraulic cylinders have also been used at each column to adjust the frame relative to the columns in order to maintain the frame level while traversing across slopes. These systems have not been found to be too satisfactory. One particular disadvantage with such systems is that all four columns are essentially fixed to the frame by the hydraulic cylinder associated therewith. If one wheel comes to a small depression in the ground, the other three wheels can maintain the harvester frame level while the first wheel becomes suspended above the ground. As a result, with ground-engagement lost by that wheel, the wheel will simply spin in air and the machine will stop its forward progress until the operator of the machine takes some step to lower the suspended wheel into engagement with the ground. The same situation will occur if one wheel goes over a hump in the ground. That end of the machine will raise but if the side-to-side levelness is maintained, the other wheel on that end of the machine will be lifted off the ground so that it will spin in the air.

SUMMARY OF THE INVENTION

In the present invention the rear wheel columns are vertically adjustable relative to the frame and hydraulic cylinders are used to adjust just those columns relative to the frame and hold them in adjusted position so that the frame is maintained level from side to side.

The front end of the frame is suspended from the front wheel columns by a cable suspension system which allows the front wheel columns to move up and down freely but in a slaved-together manner in the frame to support the frame which is being held level by the hydraulic cylinders acting on the wheel columns at the other end. As a result, the centerline of the frame and picking apparatus stays equally spaced between the wheels. As another result, if one of the wheels at the cable suspension end comes to a depression in the ground, the wheel drops into the depression, its companion wheel stays at the same level, the frame bears down on both wheels and full traction with the ground is maintained.

The cable suspension system for the front columns is also connected to the rear columns so that if the rear end of the frame is raised or lowered relative to the ground, the front end is also raised or lowered by the same amount.

In particular a cable suspension system is provided in which each of the four wheel columns has a cable flight extending vertically from a fixed reference point on the column to a fixed reference point on the frame, the length of the cable flight varying as the column moves vertically relative to the frame, and in which the cable flights at the front end of the machine are free to vary equally and oppositely in length when the cable flights at the rear end are either unchanging in length or are changing by equal and opposite amounts, and wherein an increase or decrease in the combined length of the rear cable flights will produce a corresponding increase or decrease in the combined length of the front cable flights.

Other objects and advantages will become apparent in the course of the following detailed description.

BRIEF DESCRIPTION OF THE DRAWINGS

In the drawings forming a part of this application and in which like parts are designated by like reference numerals throughout the same, FIG. 1 is a perspective view illustrating a basic supported frame constructed in accordance with the invention;

FIG. 2 is a generally schematic diagram of a hydraulic control system for the operation of the apparatus of FIG. 1;

FIGS. 3, 4, 5 and 6 are elevational views, from the rear, of a mechanical grape harvester utilizing the wheeled frame of FIG. 1. FIG. 3 shows the harvester on level ground. FIG. 4 shows the harvester traversing across a slope, and illustrates the elevation of the frame-supported harvester conveyors relative to the wheels and ground when the frame is leveled about the longitudinal centerline of the machine. FIG. 5 is similar to FIG. 4 and illustrates the machine when leveled about the uphill wheels. FIG. 6 illustrates the machine on level ground with the wheel-frame system having been operated to raise the frame and conveyors relative to the ground;

FIGS. 7, 8, 9 and 10 are elevational views, from the front, of a mechanical grape harvester utilizing the wheeled frame of FIG. 1, the conditions illustrated in FIGS. 7–10 being the same as those illustrated in FIGS. 3–6, respectively;

FIG. 11 is a front elevational view of a grape harvester illustrating the condition wherein one of the front wheels goes over a bump on the ground;

FIG. 12 is a front elevational view of a grape harvester illustrating the condition wherein one of the front wheels drops into a depression in the ground;

FIG. 13 is a simplified illustration of the grape harvester of FIG. 1, modified to provide for raising or lowering the front end of the frame relative to the rear end thereof;

FIGS. 14–17 are simplified illustrations of various modifications of the cable suspension of the frame from the corner column members;

FIG. 18 is a circuit diagram of a modification of the hydraulic control system.

DESCRIPTION OF THE PREFERRED EMBODIMENTS

Referring now to the drawings, wherein are shown preferred embodiments of the invention, and in particular to FIG. 1, the wheeled frame 10 comprises a generally rectangular rigid frame 11, having a bearing sleeve 12 at each corner thereof in which vertical column members 13, 14, 15 and 16 are mounted for vertical sliding movement. Each column member has a ground-engaging wheel 17 mounted at the lower end thereof. Preferably each wheel is driven by a hydraulic motor 18 associated therewith, the motors being supplied with hydraulic fluid under pressure and controlled by conventional apparatus (not shown). Columns 13 and 14, for the front wheels, are rotatable in sleeves 12 for steering purposes, while rear wheel columns 15 and 16 are splined by conventional means (not shown) to their collars 12 to permit relative vertical movement while restraining rotation of the columns in the sleeves.

Columns 15 and 16 each have a collar 19 fixed to the lower end thereof to which the lower ends of the movable pistons 21 and 22 of hydraulic cylinders 23 and 24 are attached, the cylinder housings being mounted at their upper ends to frame 11. The hydraulic cylinders and their pistons may be considered as variable members, the variation in length thereof being used to adjust the columns vertically relative to the frame.

A flexible, but inextensible, cable 25 is anchored to bearing plate 26 on top of shock-absorbing compression spring 27, the latter resting on frame 11, the cable extending downwardly and being trained around pulley 28 which has its axis fixed to collar 19 on column 15, the cable then proceeding upwardly and passing around pulley 29 on frame 11. The cable then extends to the front of frame 11, passing around pulley 30 on the frame adjacent column 14, then upwardly and over the pulleys 31 on the upper end of column 14, down to and around frame pulley 32, over to frame pulley 33, up to, around and over pulleys 34 on the upper end of column 13, back down to pulley 35 on the frame adjacent column 13, then to the back of the frame, down around pulley 36 on the frame adjacent column 16, down to and around pulley 37 on collar 19 on column 16 and then upwardly to and through the shock-absorbing compression spring 38, terminating at bearing plate 39 which rests on top of the frame-supported spring 38.

The pulleys on the column members, i.e., pulleys 28, 31, 34 and 35, may be regarded as fixed reference points on these columns and the pulleys on the frame adjacent the columns i.e., pulleys 29, 30, 32, 33, 35 and 36, may be regarded as fixed reference points on the frame. The cable may also be regarded as having variable length cable flights 25a, 25b, 25c and 25d extending generally vertically from the fixed reference-point pulleys on the columns to the fixed reference-point pulleys on the frames adjacent columns 12, 13, 14 and 15 respectively.

In the system thus far described, the rear columns 15 and 16 are independently movable up and down relative to the frame by the variable-length hydraulic cylinders and pistons. The front end of the frame is suspended from the front columns 13 and 14 by cable 25, the cable being used to slave the front columns together. Thus, an upward movement of front column 13 relative to the frame will increase the lengths of cable flights 25a which in turn correspondingly reduces the length of cable flights 25b, since the cable can run freely around frame pulleys 32 and 35, so that column 14 will simultaneously move downwardly relative to the frame.

In order to operate the mechanism, a hydraulic supply and control system must be provided whereby the hydraulic cylinders 23 and 24 can be operated so that their pistons extend simultaneously, or retract simultaneously or wherein one extends while the other is allowed to retract.

FIG. 2 illustrates one form of a hydraulic system for operation of the mechanism. It will be noted that each rear column 15 and 16 is provided with a stop collar 40 fixed thereto and movable therewith, the stop collar being engageable with the frame to limit the extent of downward movement of the frame on the columns. When the system is used in a harvesting machine the collars 40 will be set at a height on the columns so that the conveyors under the plants will be at the minimum desirable ground clearance when the frame rests on the stop collars.

Pump 41 has its inlet connected to oil reservoir 42 and continuously supplies oil under pressure to the pressure main 43 which delivers hydraulic fluid to all hydraulic apparatus on the machine, as for example through a control system (not shown) to the fluid motors 18 on each of the wheels 17. Return main 44 returns hydraulic fluid back to reservoir 42.

Hydraulic fluid is delivered through pressure line 43a to the four-way elevator valve 45 which is used to control the raising or lowering of the frame on the wheel columns. If it is desired to raise the frame on the columns, valve 45 is moved to the right from the illustrated position. Fluid under pressure can now flow through the valve to flow divider 46, which may comprise two gear pump members 47 and 48 connected together by shaft 49. Such a flow divider will divide the incoming fluid and deliver an equal rate of flow of fluid to the two outlet lines 51 and 52 and to the upper ends of cylinders 23 and 24 even though the pressure in the two cylinders may be different. Such a flow divider also allows fluid to flow reversely through both sections thereof but will not allow flow in opposite directions through the two sections thereof.

When sufficient fluid has been introduced into cylinders 23 and 24 to extend the piston and raise the frame to the desired height the valve 45 is returned to the illustrated neutral position, blocking off flow from the cylinders.

To lower the frame, valve 45 is moved to the left from its neutral position. The weight of the frame will cause the cylinders to move downwardly relative to the pistons, forcing the fluid in the upper parts of the cylinders to flow back through the flow divider 46 and valve 45 to the return line 44a. When the frame has been sufficiently lowered, valve 45 is returned to its neutral position.

Fluid under pressure is also delivered through pressure line 43b to the four-way leveling valve 55. Although valve 55 could be operated manually, this valve is preferably arranged for automatic operation. For example, a vertical tube 56 is mounted on the frame 11, the tube having a pendulum 57 therein, the lower end being disposed in damping fluid 58. If the frame 11 tilts downwardly to the right, pendulum 57 will swing to the right in and relative to the tilting tube 57 and link 59 will move the leveling valve 55 to the right from its illustrated neutral position. Conversely, if the frame tilts downwardly to the left, leveling valve 55 will be moved to the left from its neutral position.

Movement of leveling valve 55 to its left position will allow pressure fluid to flow from pressure line 43g, through valve 55, line 60, check valve 61, line 62 to line 52 and then to cylinder 24. Piston 22 extends, to raise the frame on column 16 back to level position. At the same time, the fluid in cylinder 23 can exhaust through line 51, line 63, flow restrictor 64, line 65, and valve 55 to return line 44g. When the frame has returned to level, pendulum 57 will return the level control valve 55 to its neutral position. Opposite tilting of the frame will cause valve 55 to be moved to the right, to deliver pressure fluid through check valve 66 to cylinder 23 and will relieve cylinder 24 through flow restrictor 67.

FIGS. 3 and 7 are back and front views of a harvesting machine on level ground, showing the frame positioned on the wheel columns so that the conveyors 70 mounted on the frame are positioned with minimum ground clearance. The total length of cable 25 is such that the frame will be supported from the front columns 13 and 14 above the front column wheels at an elevation the same as that in which the rear end of the frame is supported above the rear column wheels by hydraulic cylinders 23 and 24. If the machine traverses across level ground, the frame will not move vertically relative to any of the wheeled columns and the frame will remain level from side to side and front to back. If the machine travels up a hill, the frame will tilt front to back, allowing the conveyors to remain parallel to the ground.

FIGS. 4 and 8 illustrate the operation of the mechanism when traversing across a hill, with the apparatus being operated to level the frame from side to side about the longitudinal centerline thereof. As the machine comes to such a slope, the frame 11, being held in fixed relation to columns 15 and 16 by cylinders 23 and 24, will begin to tilt downhill. This will cause the level control valve 55 to operate so that fluid is introduced into the downhill cylinder 23 and relieved from uphill cylinder 24. If flow restrictor 67 is properly sized, the rates of flow into cylinder 23 and from cylinder 24 will be equal so that pistons 21 and 22 equally move equally and oppositely until the frame becomes level. The equal and opposite movement of columns 15 and 16 will maintain the center of the frame between the columns at the same height above the ground.

The equal and opposite movement of columns 15 and 16 will also act to move the pulleys 28 and 35 thereon in equal and opposite vertical amounts. As a consequence, although the lengths of the cable flights 25c and 25d have individually changed, the combined length of the cable flights 25c and 25d remains the same. Referring back to FIG. 1, as column 15 moves down relative to the frame, the cable flights 25c will lengthen, pulling cable 25 over all of the pulleys on the frame and on the front columns, and will shorten the cable flights 25d associated with column 16. Such cable movement does not affect the total combined length of the cable flights 25a and 25b associated with the front columns 13 and 14.

However, with the frame held level, by the action of cylinders 23 and 24, the front wheels will adjust as shown in FIG. 8 so that they maintain ground contact. In a sense, the sloped ground forces column 13 upwardly relative to the frame, causing the cable flights 25a to lengthen. Since cable 25 is free to run over frame pulleys 32 and 33, this will cause a corresponding shortening of cable flights 25b, forcing column 14 downwardly relative to the frame. In comparing FIGS. 7 and 8, cable flights 25a have lengthened in FIG. 8 and cable flights 25b have shortened. However, the combined length of flights 25a and 25b remains the same, and the frame remains supported from the two columns in level position with the center of the frame at the same height above the ground vertically therebeneath.

Operation as described, wherein the platform is maintained level about its longitudinal centerline, can be used when the machine is operated with a substantial ground clearance. However, when it is desired to harvest with a minimum ground clearance of the conveyors, i.e., as in FIGS. 3 and 7, such operation will result in lowering the uphill conveyor onto the ground, causing damage thereto.

When using a minimum ground clearance, it is thus very essential to operate the machine so that it levels about the uphill wheels, as shown in FIGS. 5 and 9. To so operate, the stop collars 40 are used on columns 15 and 16. When the machine is ready to be used for harvesting, the frame is lowered by the elevator valve 45 so that the frame rests on the stop collars 40, which positions the conveyors with the desired minimum ground clearance.

When the machine begins to traverse across a slope, e.g., as in FIG. 5, the frame will again start to tilt, causing the level control valve to be moved to the right. As before, this will cause pressure fluid to be delivered to downhill cylinder 23, and will allow cylinder 24 to exhaust fluid through flow restrictor 67. However, since the collar 40 on column 16 is in engagement with the frame, the frame cannot move downwardly on column 16, and no fluid is forced from cylinder 24. The flow into cylinder 23 causes the column 15 to move downwardly relative to the frame, which movement will continue until the frame is level with column 15 firmly engaging the ground. Thus, as seen in FIG. 5, only column 15 has moved relative to the frame, the frame is level and at the same height above the uphill wheel as before.

Such downward movement of column 15 causes an elongation of the cable flights 25c associated therewith. Since the length of cable flights 25d is unchanged, the increase in length of cable flights 25c causes the combined length of cable flights 25a and 25b to shorten by a corresponding amount. The front columns are again free as before to move relative to the level frame and contact the ground. As a result, the front columns seek their own level, and because of the now shortened combined lengths of cable flights 25a and 25b, will support the frame, with the frame being level and with the height of the uphill conveyor relative to the uphill wheel being the same as before.

The machine will then traverse the slope with the uphill conveyor maintained at proper ground clearance. If the slope becomes greater, the downhill columns at front and back will both move further downwardly relative to the frame.

When the machine again comes to level ground, the frame will tend to tilt in the opposite direction, causing the level control valve 55 to move to the left. This will allow pressure fluid to flow to cylinder 24 and will allow fluid from cylinder 23 to be relieved through flow restrictor 66. For operation wherein leveling is accomplished relative to the uphill wheels, the flow restrictors 66 and 67 are sized so that they will restrict flow sufficiently that the frame does not lower abruptly, but will allow greater flow from the cylinders than the flow of the pressure fluid thereto. As a result, frame 11 will move down on column 15 until it comes to rest on stop collar 40 thereon before piston 22 begins to extend. A return of the frame to level position will return the level control valve 55 to its neutral position. The frame will again rest on both stop collars 40. If the slope of the ground has reversed, instead of merely becoming level, after cylinder 23 has exhausted so that the frame rests on the collar 40 of column 15 and can move no further down thereon, the flow of fluid into cylinder 24 will cause the frame to move upwardly on column 16 until the frame is level, at which time column 15 will be the uphill column and the height of the conveyor relative thereto will be as desired.

FIGS. 6 and 10 illustrate the machine showing the frame and conveyors raised, either in the event that harvesting is to be accomplished on higher plants or if the harvester is to be driven to or from a harvesting location. To raise the frame the elevator valve 45 is moved to the right, from the neutral position shown in FIG. 2, to deliver fluid under pressure equally to both cylinders 23 and 24. The pistons 21 and 22 extend equally, raising the rear of the frame while maintaining it level. As seen in FIG. 1, this movement will cause cable flights 25c and 25d to extend so that the total combined length thereof increases. This increase pulls the cable 25 around the frame pulleys to cause an equal decrease in the combined length of cable flights 25a and 25b, thereby pulling the front end of the frame upwardly on the front columns 13 and 14 by the same amount that the rear end of the frame moves up on the rear columns.

Lowering of the frame is accomplished by moving the elevator valve 45 to the left, allowing both cylinders 23 and 24 to exhaust. As the frame descends on the rear columns, the cable flights 25c and 25d decrease in length with the resulting slack being taken up by a corresponding increase in length of the cable flights 25a and 25b at the front of the machine.

FIG. 11 illustrates the operation of the front end of the machine as the machine is driven across level ground and one of the front wheels is driven over a bump in the ground. The wheel will ride up on the bump, causing column 13 to move upwardly. The frame 11 is maintained level by the cylinders 23 and 24 on the rear columns, and the elevation of the front column 13 will cause the cable flights 25a to lengthen, producing a corresponding shortening of cable lengths 25b. As a result, the front end of the frame will be pulled upwardly by an amount half the difference between the elevation of the front wheels. The frame remains level from side to side, and bears down on both front wheels so they remain in firm contact with the ground so that no driving power is lost.

FIG. 12 illustrates the operation when one of the front wheels passes over a depression in the ground. The wheeled column 14 is free to drop into the depression, and the cable suspension causes the front end of the frame to lower by an amount equal to half the difference of the vertical heights of the front wheels. Again, the front end of the frame remains level from side to side and it bears down on both front wheels to maintain those wheels in firm ground engagement.

In the situations illustrated in FIGS. 11 and 12, the rear wheels are assumed to be on level ground. As a consequence, there is no operation of the cylinders 23 or 24 and no movement of the frame relative to the rear columns. Both rear wheels maintain firm ground contact as the front end wheels move up and down relative to the frame to accommodate to irregularities in the ground at the front end.

If the machine is driven over level ground and one of the rear wheels comes to a ground irregularity, the system will again operate to maintain all four wheels in firm ground engagement. For example, suppose one of the rear wheels comes to a ground depression. Since the cable suspension at the front end allows movement of the frame relative to the front columns, the frame is free to tilt so that the rear wheel drops into the depression, with weight still being imposed on the ground by all four wheels. Tilting of the frame will actuate the leveling apparatus to raise the frame relative to the wheel in the depression back to level condition. The front end of the frame will also be brought back to level, again maintaining weight on both front wheels at all times while so doing. After the rear wheel drives out of the depression the frame will again level itself.

A corresponding action will occur if one of the rear wheels is driven over a bump. Thus, if any one of the wheels is raised by a bump or if it comes to a depression in the ground, all four wheels stay in firm driving engagement with the ground. The same is true for any combination of ground irregularities. For example, if wheel columns 13 and 15 are both driven simultaneously over bumps, the front wheels will self-adjust to the frame because of the cable suspension, and the rear wheels will adjust to the frame by the leveling system which operates cylinders 23 and 24.

Although in normal harvesting it is desired to maintain the conveyors parallel to the ground from front to back of the machine, whether harvesting on level ground or going up a slope, as is accomplished by the cable suspension of FIG. 1, it may be desirable to make provision for raising or lowering the front end of the frame relative to the rear end thereof. This can be easily accomplished with the cable suspension system modified as in FIG. 13. In this system, the cable flight 25c which extends to end plate 26 of FIG. 1 is instead trained around frame pulley 71 and is connected to piston 72 of hydraulic cylinder 73 mounted on frame 11. A four-way control valve 75 (FIG. 2) is provided so that piston 72 can be positively retracted or allowed to extend. If valve 75 is operated to retract the piston, cable 25 will be pulled around the various pulleys over which it is trained. Cylinders 23 and 24 hold the rear columns stationary relative to the frame and thus the pull on the cable will serve to decrease the length of cable flights 25a and 25b on the front end of the frame, thereby pulling the frame upwardly on the front columns. Movement of piston 72 in the opposite direction allows cable flights 25a and 25b to lengthen, lowering the frame on the front wheel columns.

FIGS. 14–17 illustrate schematically various arrangements of cable suspensions whereby the frame and columns systems may operate in the same manner.

In FIG. 14, the cable suspension 80 is such that there are again two cable flights 80a and 80b associated with the front columns 13 and 14, but only a single cable flight 80c and 80d associated with the rear columns 15 and 16. Cable flight 80d extends over frame pulley 36 and is connected to movable pulley 81. One of the cable flights 80a is trained over frame pulley 35, the cable then extending to and trained around movable pulley 81 and anchored to the frame at 82. Cable flight 80c is similarly attached to movable pulley 84 and a cable flight 80b is similarly arranged so that the front end cable extends around movable pulley 84 and back to piston 72 of hydraulic cylinder 73. In this system, the amount of lengthening or shortening of the single cable flights 80c and 82 will be doubled by the movable pulley arrangement so that if the frame is moved vertically relative to the rear columns 15 and 16 so that the combined length of the two cables 80c and 80d are changed, the combined length of one of the doubled cable flights 80a and one of the doubled cable flights 80b will change by an equal amount. Operation of this system is otherwise the same as the embodiments previously described.

FIG. 15 shows an arrangement wherein the cable suspension system 90 has a single flight 90a and 90 associated with each of the front columns 13 and 14, the cable extending from frame pulley 33 to frame pulley 91, then to and around movable pulley 92, back to frame pulley 93 and over to frame pulley 32. The single cable flights 90c and 90d at the rear of the frame are similarly trained around movable pulley 94, the two movable pulleys 92 and 94 being connected together by link 95. Equal and opposite movement of the front columns 13 and 14 relative to the frame can take place with the cable extending between flights 90a and 90b running around pulleys 33, 91, 92, 93 and 32 with pulley 92 being fixed relative to the frame. Similarly the rear columns 15 and 16 can be moved in equal and opposite directions relative to the frame without affecting movement of pulley 94 relative to the frame. If columns 15 and 16 are both moved downwardly relative to the frame, by cylinders 23 and 24, the increase in length of cable flights 90c and 90d will pull pulleys 94 and 92 rearwardly of the frame. Such movement of pulley 92 thus causes the combined lengths of cable flights 90a and 90b to shorten, pulling the frame upwardly on the front columns 13 and 14. Again, operation of cylinders 23 and 24 by a control system as in FIG. 2 will operate the system to produce the same results as with the system of FIG. 1.

FIG. 16 is yet another cable suspension system 100 for accomplishing the same results. In this form, the cylinders 23 and 24 may be situated in any convenient place on the frame rather than therebelow as before. The cable flights 100c and 100d are used in this embodiment to support the frame from the rear columns 15 and 16, the cable flights being connected to and for actuation by pistons 21 and 22 of cylinders 23 and 24. The cable flights 100a and 100b associated with the front columns 13 and 14 are part of a continuous cable connected at one end to piston 21 and at the other end to piston 22. If cylinders 23 and 24 are simultaneously operated to extend piston 21 and retract piston 24 by equal and opposite amounts, the frame will be pulled up relative to rear column 15 and lowered relative to rear column 16, without affecting the combined length of cable flights 100a and 100b, which are free to move up and down relative to each other in the same manner as in all of the previous embodiments. Simultaneous operation of pistons 21 and 22 in the same direction will cause the frame to raise or lower on all four columns simultaneously. Operation of hydraulic cylinder 73 can raise or lower the front end of the frame relative to the rear end.

The system shown in FIG. 16 can be operated to level the frame about the centerline thereof by simultaneous operation of the pistons of cylinders 23 and 24 in equal and opposite directions, or can be operated to level the frame about the uphill columns by operation of one of the cylinders 23 or 24 alone. If it is desired to operate such system so that it levels about the uphill columns, utilizing a control system as in FIG. 2, then the system should be modified as shown in FIG. 17 wherein the rear columns 15 and 16 have stop collars 40 thereon to limit downward movement of the frame thereon. Cable flights 100c and 100d are used, as in FIG. 16, to raise, lower and level the frame by operation of cylinders 23 and 24. The cable suspension system 110 for the front columns is substantially the same as that shown in FIG. 1 and operates in the same way, with cable flights 110c and 110d being used to sense movement of the rear columns relative to the frame and control movement of cable flights 110a and 110 b as previously described.

FIG. 18 illustrates another form of hydraulic control system usable with the previously described frame-support assemblies, and particularly those of FIGS. 1, 13, 14 and 15 wherein the hydraulic cylinders 23 and 24 directly produce vertical movement of the wheeled supports relative to the frame. In many uses, such as with harvesting machines, dust, grease and foreign objects can accumulate in the rear column bearings so that the frame does not lower in the columns when the pressure in cylinders 23 and 24 is relieved. It is thus desirable to use double-acting cylinders 123 and 124 so that the hydraulic system will positively extend and retract the pistons 121 and 122 to positively move the columns downwardly and upwardly relative to the frame.

In this system conventional pilot-operated check valves are used, such valves being normally operable as a conventional unidirectional check valve but also operable in response to a pilot pressure to remain open for free bidirectional flow therethrough. Such valves are represented on the drawing as two separate valves, e.g., 125a and 125b, valve 125a being operable at all times as a conventional check valve, and pilot valve 125b being normally closed but operable to open bidirectional flow position in response to the presence of a high pressure, e.g., as in line 126.

To raise the frame, elevator valve 45 is moved to the right. Pressure fluid flows through line 127, check valve 125a, flow divider 128 to the upper end of both cylinders 123 and 124. Fluid from the lower ends of the cylinder flows through pilot valves 129b and 130b (which are open due to the pressure in line 127), through flow restrictor 131 and valve 45 to the oil reservoir.

In lowering the frame, pressure fluid flows through valve 45, line 126, check valve 132 and check valves 129a and 130a to the lower ends of cylinders 123 and 124, to positively force pistons 121 and 122 upwardly. Fluid from the upper ends of cylinders 123 and 124 flows back through flow divider 128, pilot valve 125b, line 27 and valve 45 to the oil reservoir.

In leveling, if the level control valve 55 is moved to the right by pendulum 57, pressure fluid flows through check valve 133, line 134, check valve 135a to the upper end of cylinder 123 and through check valve 136a to the lower end of cylinder 124. Fluid from the lower end of cylinder 123 flows through pilot valve 137b, and fluid from the upper end of cylinder 124 flows through pilot valve 138b, to line 139, through flow restrictor 140 and valve 55 to the oil reservoir.

Movement of the level control valve 55 to the left allows pressure fluid to flow through check valve 143, line 139 and check valves 137a and 138a to the lower and upper ends of cylinders 123 and 124 respectively. Return flow from the upper and lower ends of those cylinders occurs through pilot valves 135b and 136b, line 134, flow restrictor 144 and valve 45 to the oil reservoir.

If flow restrictors 140 and 144 are used wherein the rate of discharge flow therethrough is equal to the rate of flow into the cylinders, then the control system can be utilized to level a frame about its longitudinal centerline. If the flow restrictors permit a greater flow, then the control system can be used to level a frame about its uphill side, providing the stop collars 40 are utilized on columns 15 and 16.

Although hydraulic cylinders have been shown and described for use in raising and lowering the rear columns relative to the frame, it should be recognized that equivalent actuation of these columns relative to the frame could be accomplished by a ball screw extending through the frame and connected to the rear columns and rotatable in the frame by a motor to raise or lower the columns, or by other known devices capable of mechanically extending or retracting the column relative to the frame. Regardless of the specific manner in which power is applied to adjust the rear columns, the cable suspension system will sense such movement and affect the front columns in a manner as described herein.

It is also to be realized that the terms "front" and "rear" have been used in the description merely to distinguish one end of the frame from the other. The end of the frame suspended from columns 13 and 14 could be the "rear" end of the frame if desired.

Having thus described my invention, I claim:

1. A supported frame and leveling apparatus therefor comprising:
    a. a rigid frame,
    b. first and second ground-engaging supports mounted at one end of said frame for individual and independent vertical movement relative thereto;
    c. first and second variable-length members connected between and supporting said frame on said first and second supports respectively;
    d. means interconnecting said first and second variable-length members for equally and oppositely changing the length of one of said members in response to a change in the length of the other of said members;
    e. third and fourth ground-engaging supports mounted at the other end of said frame for individual and independent vertical movement relative thereto;
    f. third and fourth variable-length members connected between and supporting said frame on said third and fourth support members;
    g. means including a first control means therefor for actuating at least one of said third and fourth variable-length members to change the length thereof.

2. Apparatus as set forth in claim 1, wherein said first and second variable-length members and said means (d) comprise a flexible cable having a variable-length flight portion extending down from said first support, said cable then passing freely around pulleys on said frame and then having a variable-length flight portion extending upwardly to said second support.

3. Apparatus as set forth in claim 2 wherein said third and fourth variable-length members are each hydraulic cylinders and further including:
    h. variable-length flexible cable flight portions extending vertically from each of said third and fourth supports to said frame, and
    i. means operatively connecting the cable flight portions associated with said third and fourth supports to the cable flight portions associated with said first and second supports for enabling:
        1. the cable flights associated with said third and fourth supports to vary equally and oppositely in length without affecting the lengths of the cable flights associated with the first and second supports, and
        2. a change in the combined length of the cable flights associated with said third and fourth supports to produce a corresponding change in the combined length of the cable flights associated with said first and second supports.

4. Apparatus as set forth in claim 1, wherein said third and fourth variable-length members are independently actuable and wherein said first control means controls said means (g) to actuate at one time only one of said third and fourth variable-length members to vary the combined length of said third and fourth variable-length members, and further including:
    h. means for correspondingly changing the combined length of said first and second variable-length members in response to a change in the combined length of said third and fourth variable-length members.

5. Apparatus as set forth in claim 4, wherein said means (g) includes interengageable stop members on said third and fourth ground-engaging supports and said frame to limit downward movement of said frame relative to said third and fourth ground-engaging supports.

6. Apparatus as set forth in claim 4, wherein said first and second variable-length members and said means (d) comprises a flexible cable having a variable-length flight portion extending down from said first support, said cable then passing freely around pulleys on said frame and then having a variable-length flight portion extending upwardly to said second support, and wherein said third and fourth variable-length members are each hydraulic cylinders.

7. Apparatus as set forth in claim 6, wherein said means (h) includes flexible cables connected to each of the third and fourth supports and having variable-length flight portions extending vertically to said frame, and means for changing the combined total length of the cable flights associated with the first and second supports in accordance with a change in the combined total length of the cable flights associated with said third and fourth supports.

8. Apparatus as set forth in claim 4 and further including means responsive to a tilting of said platform for actuating said first control means to increase the length of the variable-length member associated with the side of the platform which tilts downwardly.

9. Apparatus as set forth in claim 4 wherein said means (g) further includes a second control means for controlling said means (g) to actuate both of said third and fourth variable-length members to change their lengths simultaneously and in the same direction.

10. Apparatus as set forth in claim 9 and further including:
   i. means and a third control means therefor for varying the combined length of said first and second variable-length members independently of the length of said third and fourth variable-length members.

11. Apparatus as set forth in claim 1, and further including:
   h. means interconnecting said third and fourth variable-length members for equally and oppositely changing the length of said fourth variable-length members in response to a change in the length of said third variable-length member.

12. Apparatus as set forth in claim 2, wherein said fourth variable-length member comprises a flexible cable flight extending down from said fourth support to said frame and further including a flexible cable continuing from said fourth variable-length cable around pulleys on said frame and then upwardly to said third support.

13. Apparatus as set forth in claim 1 wherein said third and fourth variable-length members are independently actuable and wherein said first control means controls said means (g) to actuate said third and fourth variable-length members simultaneously to increase the length of one while decreasing the length of the other in an equal amount.

14. Apparatus as set forth in claim 13 and further including means responsive to a tilting of said platform for actuating said first control means.

15. Apparatus as set forth in claim 13 wherein said means (g) includes a second control means for controlling said means (g) to actuate said third and fourth variable-length members simultaneously to change the lengths thereof in equal amounts and in the same direction, and further including:
   h. means responsive to a change in the combined length of said third and fourth variable-length members for equally changing the combined length of said first and second variable-length members.

16. Apparatus as set forth in claim 15 and further including:
   i. means and a third control means therefor for varying the combined length of said first and second variable-length members independently of said third and fourth variable-length members.

17. Apparatus as set forth in claim 15, wherein said first and second variable-length members and said means (d) comprises a flexible cable having a variable-length flight portion extending down from said first support, said cable then passing freely around pulleys on said frame and then having a variable-length flight portion extending upwardly to said second support, and wherein said third and fourth variable-length members are each hydraulic cylinders.

18. Apparatus as set forth in claim 17, wherein said means (h) includes flexible cables connected to each of said third and fourth supports and having variable-length flight portions extending vertically to said frame, and means for changing the combined total length of the cable flights associated with the first and second supports in accordance with a change in the combined total lengths of the cable flights associated with said third and fourth supports.

19. A supported frame and leveling apparatus therefor comprising:
   a. a horizontal rigid rectangular frame;
   b. first, second, third and fourth vertical column members mounted one at each corner of said frame for vertical movement relative thereto, each column member having a ground-engaging member at the lower end thereof and each column member projecting up through said frame;
   c. first and second hydraulic cylinders connecting between said frame and said third and fourth column members respectively;
   d. means for supplying, maintaining and relieving hydraulic fluid under pressure into, in and from said hydraulic cylinders;
   e. a plurality of pulleys mounted on said frame adjacent said column members;
   f. flexible cable means trained around said pulleys and extending vertically from a fixed reference point on said third column to said frame, then along said frame, then upwardly and over a pulley on said first column member and downwardly to said frame, then upwardly and over a pulley on said second column member and then downwardly to said frame, then along said frame and then vertically to a fixed reference point on said fourth column member.

20. Apparatus as set forth in claim 19 and further including means responsive to a tilting of said frame for actuating the means (d) to supply hydraulic fluid under pressure to the hydraulic cylinder associated with the side of the frame which tilts downwardly.

21. Apparatus as set forth in claim 20 and further including a stop collar mounted on each of said third and fourth column members and movable therewith, said stop collars being engageable with said frame to limit downward movement of said frame relative to said third and fourth column members.

* * * * *